(12) United States Patent
Paganelli et al.

(10) Patent No.: US 9,837,672 B2
(45) Date of Patent: Dec. 5, 2017

(54) COOLING CIRCUIT FOR FUEL CELL

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Gino Paganelli, Clermont-Ferrand (FR); Lionel Jeanrichard, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 199 days.

(21) Appl. No.: 14/406,299

(22) PCT Filed: Jun. 7, 2013

(86) PCT No.: PCT/EP2013/061823
§ 371 (c)(1),
(2) Date: Dec. 8, 2014

(87) PCT Pub. No.: WO2013/182687
PCT Pub. Date: Dec. 12, 2013

(65) Prior Publication Data
US 2015/0136352 A1 May 21, 2015

(30) Foreign Application Priority Data
Jun. 8, 2012 (FR) ...................................... 12 55363

(51) Int. Cl.
*H01M 8/04029* (2016.01)
*H01M 8/04007* (2016.01)
(Continued)

(52) U.S. Cl.
CPC .......... *H01M 8/04074* (2013.01); *G01F 1/64* (2013.01); *G01F 1/68* (2013.01); *G01F 1/688* (2013.01);
(Continued)

(58) Field of Classification Search
None
See application file for complete search history.

(56) References Cited

U.S. PATENT DOCUMENTS 6,487,904 B1 12/2002 Myhre ........................ 73/204.12
2002/0164511 A1* 11/2002 Uozumi ............ H01M 8/04029
429/429

(Continued)

FOREIGN PATENT DOCUMENTS

CN 1930717 A 3/2007
EP 1 282 183 A2 2/2003
(Continued)

*Primary Examiner* — Alix Eggerding
(74) *Attorney, Agent, or Firm* — Fitzpatrick, Cella, Harper & Scinto

(57) ABSTRACT

A cooling circuit for a fuel cell includes at least one channel, a mechanical support, a first sensor, and a second sensor. Each channel is formed in a bipolar plate of the fuel cell, and is adapted to permit a cooling fluid to flow. The first sensor senses a flow rate of the cooling fluid. The second sensor senses an electrical conductivity of the cooling fluid. Both the first sensor and the second sensor are installed on the mechanical support.

10 Claims, 3 Drawing Sheets

(51) Int. Cl.
  *H01M 8/0258* (2016.01)
  *H01M 8/04955* (2016.01)
  *H01M 8/0267* (2016.01)
  *H01M 8/0438* (2016.01)
  *H01M 8/0444* (2016.01)
  *H01M 8/04537* (2016.01)
  *H01M 8/04664* (2016.01)
  *G01F 1/64* (2006.01)
  *G01F 1/68* (2006.01)
  *G01F 1/688* (2006.01)
  *G01F 1/69* (2006.01)
  *G01F 15/00* (2006.01)
  *G01F 15/06* (2006.01)
  *H01M 8/04044* (2016.01)

(52) U.S. Cl.
  CPC .............. *G01F 1/6888* (2013.01); *G01F 1/69* (2013.01); *G01F 15/001* (2013.01); *G01F 15/061* (2013.01); *H01M 8/0258* (2013.01); *H01M 8/0267* (2013.01); *H01M 8/04029* (2013.01); *H01M 8/04417* (2013.01); *H01M 8/04485* (2013.01); *H01M 8/04634* (2013.01); *H01M 8/04679* (2013.01); *H01M 8/04955* (2013.01); *H01M 8/04044* (2013.01)

(56) References Cited

U.S. PATENT DOCUMENTS

| | | | |
|---|---|---|---|
| 2003/0022052 A1 | 1/2003 | Kearl | 429/34 |
| 2004/0170877 A1* | 9/2004 | Wakabayashi | B01J 49/0095 429/410 |
| 2004/0234835 A1* | 11/2004 | Strobel | H01M 8/04007 429/442 |
| 2007/0209977 A1 | 9/2007 | Wilf et al. | 210/85 |
| 2008/0032168 A1 | 2/2008 | Fujita | 429/24 |
| 2008/0107151 A1* | 5/2008 | Khadkikar | G01F 1/696 374/141 |
| 2011/0087389 A1* | 4/2011 | Burleigh | B60L 11/1885 701/22 |
| 2012/0237843 A1 | 9/2012 | Paganelli | 429/429 |
| 2014/0227571 A1 | 8/2014 | Paganelli et al. | 429/90 |
| 2014/0300367 A1 | 10/2014 | Paganelli et al. | 324/434 |

FOREIGN PATENT DOCUMENTS

| | | |
|---|---|---|
| JP | 2000-292391 A | 10/2000 |
| JP | 2002-184435 A | 6/2002 |
| JP | 2003-036869 A | 2/2003 |
| JP | 2003-059500 A | 2/2003 |
| JP | 2003-346845 A | 12/2003 |
| JP | 2009-530082 A | 8/2009 |

\* cited by examiner

COOLING CIRCUIT FOR FUEL CELL

TECHNICAL FIELD

The present invention relates to fuel cells. More precisely, it relates to the cooling system of a fuel cell.

RELATED ART

It is known that fuel cells enable electrical energy to be produced directly by an electrochemical oxidation-reduction reaction based on hydrogen (the fuel) and oxygen (the oxidizing agent), without an intermediate step of conversion to mechanical energy. This technology is promising, notably for motor vehicle applications. A fuel cell generally includes a stack of unitary elements, or cells, each of which is essentially composed of an anode and a cathode separated by a polymer membrane, allowing ions to pass from the anode to the cathode.

The electrochemical reactions taking place in a cell are exothermic reactions, and therefore cause a temperature rise in the cell. In order to preserve the various components of the cell, the heat given off by the electrochemical reactions must therefore be dissipated.

In existing fuel cells, this heat is typically either dissipated directly into the ambient air at the stack in the case of air-cooled cells, or transferred by means of a cooling circuit in which a heat transfer fluid such as water flows, so as to be dissipated into the ambient air at a radiator, notably a radiator provided for this purpose.

In order to prevent any deterioration of the cell, with the aim of increasing its service life, various devices exist for monitoring different quantities in the cell. This monitoring relates, for example, to the voltage at the terminals of the various cells, the pressure and moisture content of the anode and cathode, and the core temperature of the cell, as well as the temperatures of the fuel and oxidizing fluids. These monitoring devices are mainly concerned with the fuel and oxidizing gas supply circuits.

However, it has been found that it may also be useful to monitor the operation of the cooling circuit, notably in order to detect a risk of excessive heating of the cell even before this is manifested by a rise in temperature.

BRIEF DESCRIPTION OF THE INVENTION

The present invention is therefore designed to achieve this object by proposing a means for real-time monitoring of the operation of the cooling circuit. In fact, a variety of malfunctions in the cooling circuit may affect the lifetime of the cell. Thus, if the flow rate of the liquid in the circuit is insufficient, the cooling becomes less effective as a result. If the flow is interrupted, owing to a failure of the cooling pump for example, there is a high risk that hot spots will appear in the core of the cell, possibly leading to very rapid and irreversible degradation. It has therefore proved useful to monitor this flow rate in real time, so that the cell can be stopped, if necessary, should the flow rate become insufficient.

It has also been found that an excessive electrical conductivity of the cooling liquid may give rise to undesirable leakage currents, resulting in the corrosion of some elements of the cell and the consequent degradation of the cell in question. This is because the cooling liquid is in contact with the individual cells of the fuel cell, each of which is at a different potential from the others, owing to the stacking principle. The potential difference between the extreme cells of a 100-cell fuel cell may be as much as 100 volts. Because of the need to maintain efficient cooling, the cells cannot be electrically insulated from the cooling liquid. Since the whole stack is immersed in the same cooling liquid, it is important to minimize the electrical conductivity of the cooling liquid so as to limit the leakage currents flowing in the cooling liquid. The electrical conductivity of the cooling liquid is due to the fact that the liquid becomes charged with ions as it flows in the circuit. Since this ion transfer cannot be entirely eliminated, it has therefore proved useful to monitor the level of electrical conductivity in real time, so that the cell can be stopped, if necessary, should the electrical conductivity become too great. A deionizing cartridge is normally placed in the cooling circuit. The information revealing excess electrical conductivity is also an indicator that this cartridge needs to be replaced.

The present invention is therefore intended to propose a cooling circuit for a fuel cell provided with a system for monitoring these parameters. Thus the present invention relates to a cooling circuit for a fuel cell, said circuit including at least one channel formed in a bipolar plate of the fuel cell, adapted to permit the flow of a cooling fluid, and further including a sensor of the flow rate of the cooling fluid, the circuit being characterized in that it further includes a sensor of the electrical conductivity of the cooling fluid, installed on the same mechanical support as the flow rate sensor. The double sensor formed on this mechanical support is positioned so as to be capable of making measurements on the cooling liquid flowing in the channel formed in the bipolar plate.

By installing both sensors on the same mechanical support, it is possible to meet the requirements of small overall dimensions for a fuel cell, and also to provide better integration of the sensors on a terminal plate of the cell.

In an advantageous embodiment of the invention, the sensors are adapted to make measurements of flow rate and electrical conductivity in real time. This is because, as mentioned above, it is useful to be able to monitor the cooling liquid in real time, in order to prevent any degradation of the cell.

There are various known technologies for measuring the flow rate of a fluid. Thus, in an advantageous embodiment of the invention, the cooling fluid flow rate sensor comprises two fins and means for measuring a temperature difference between the two fins.

In another advantageous embodiment of the invention, the electrical conductivity sensor comprises two electrodes and means for measuring the impedance between these two electrodes.

In another advantageous embodiment of the invention, the cooling circuit includes means for transmitting the measurements made by the sensors to a controller of a fuel cell in which the cooling circuit is installed.

The invention also relates to a method for controlling a fuel cell cooled by a cooling circuit according to the invention, the method comprising the following steps:
 the step of comparing the flow rate measurement output from the flow rate sensor, in real time, with a first predetermined threshold,
 if the value of the flow rate falls below the first threshold, causing the fuel cell to be stopped.

The invention also relates to a method for controlling a fuel cell cooled by a cooling circuit according to the invention, the method comprising the following steps:
 the step of comparing the measurement output from the electrical conductivity sensor, in real time, with a second predetermined threshold, and if the value of the electrical conductivity rises above the second threshold, causing the fuel cell to be stopped.

The invention also relates to a fuel cell provided with a cooling circuit according to the invention.

BRIEF DESCRIPTION OF THE DRAWINGS

Other objects and advantages of the invention will become clearly apparent from the following description of a preferred, but non-limiting, embodiment, illustrated by the following figures, in which.

DESCRIPTION OF THE BEST EMBODIMENT OF THE INVENTION

Figure 1:
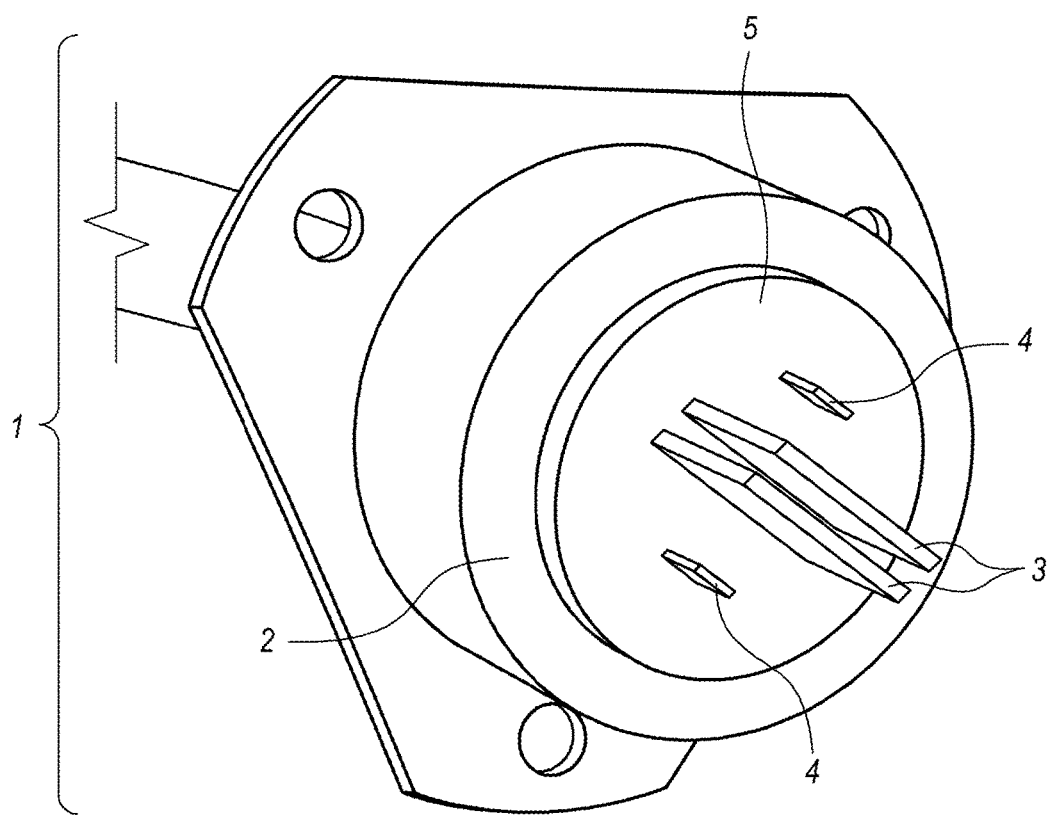
FIG. 1 shows a mechanical support on which a flow rate sensor and a conductivity sensor are installed.

The present invention relates to a cooling circuit for a fuel cell. This cooling circuit comprises a double sensor 1, corresponding to a flow rate sensor and an electrical conductivity sensor, mounted on the same mechanical support 2. This mechanical support is installed on the terminal plate of the fuel cell through which the cooling circuit passes.

The flow rate sensor is a sensor which is sensitive to the variations of thermal conductivity, and which comprises a support having, notably, a means for heating in controlled conditions, and a means for monitoring the temperature of this support. In stable conditions, this temperature is dependent both on the supply of heat from the heating means and on the dissipation of heat from the support into its ambient environment. The heat dissipation is itself dependent, on the one hand, on the difference between the temperature of the support and that of the ambient environment, and, on the other hand, on the thermal conductivity of the cooling liquid.

Thus this double sensor 1 comprises a first pair of fins, each containing a platinum resistance (thermistor), immersed in the cooling liquid and identified by the reference 4, for making flow rate measurements. At the first fin, a voltage is applied to the resistance in order to heat it; the flow of cooling fluid cools this resistance, the degree of cooling of the resistance becoming greater as the flow rate increases. The second fin is used to measure the temperature of the cooling fluid. The applied voltage is regulated so as to maintain a constant temperature difference between the first resistance and the cooling fluid. The value of the applied voltage is measured and used to quantify the flow rate.

However, it has been found that, in some situations, the application of a variable voltage may give rise to a problem of galvanic corrosion related to the potential. To avoid this, in a preferred embodiment, an alternating voltage with a mean value of zero is applied to the two resistances through a voltage divider bridge. The voltage difference between the two sides of the divider bridge is measured and used to quantify the flow rate.

The double sensor 1 further comprises a second pair of larger fins, identified by the reference 3, for measuring the electrical conductivity. This measurement is made by measuring the impedance at each instant between the two fins forming electrodes. Since the two plates 4 have interchangeable functions, they are given the same reference in this case.

Figure 3:
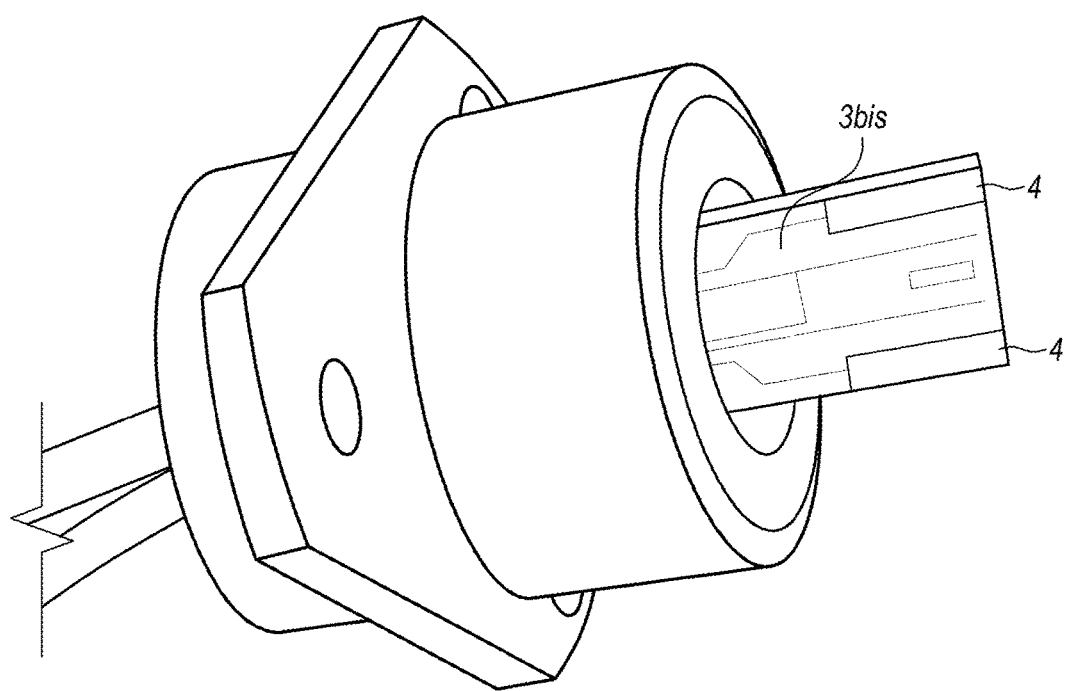
FIG. 3 shows another embodiment of a mechanical support as shown in FIG. 1.

In another embodiment, shown in FIG. 3, the two electrodes used for measuring the impedance are integrated into a single fin 3bis. This configuration does not modify the principle of the flow rate measurement, and it facilitates the integration of the system.

For both the flow rate sensor and the electrical conductivity sensor, it is possible to interrupt the measurement in order to maximize the suppression of any potential that might cause corrosion.

Calibration is required for both the flow rate sensor and the electrical conductivity sensor.

Preferably, the double sensor should be mounted in such a way that the fins 3 and the fins 4 are orientated so as to offer minimum resistance to the movement of the cooling liquid; that is to say, the fins are positioned so as to be aligned in the direction of flow of the cooling liquid.

In one embodiment, the mechanical support of the double sensor is provided with a gasket so as to prevent any leakage of cooling liquid to the exterior. There should also be a seal between the fins 3 and 4 and the set of electronic components, so as to prevent leaks of the cooling liquid. In the case of FIG. 1, this sealing barrier is made of silicone. The fins 3 and 4 are integrated into this silicone sealing barrier 5 with the sensitive parts of the fins left free so as to remain in contact with the cooling liquid.

In some configurations, it is found that this silicone gasket fails to provide a perfect seal. Thus, in a preferred embodiment, the seal is provided by using a physical barrier printed directly on to the circuit, in which a gasket is installed.

Figure 2:
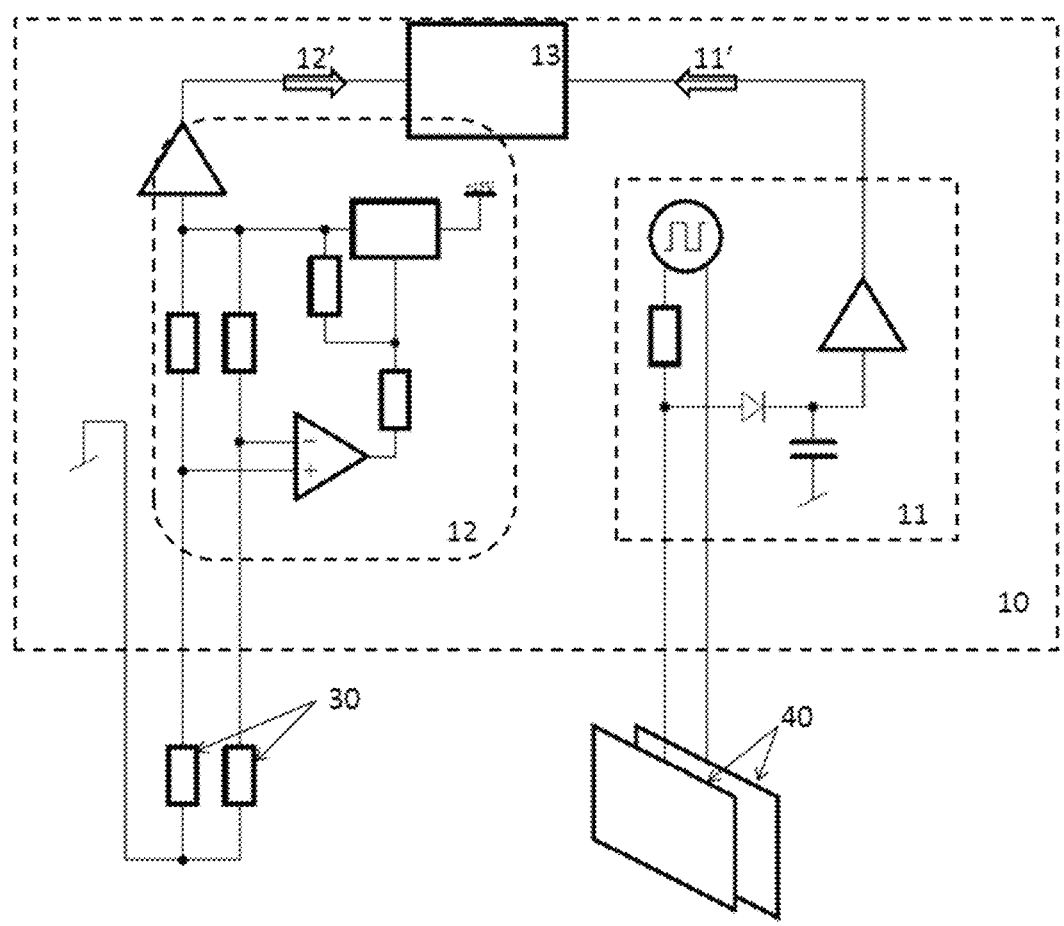
FIG. 2 shows a functional block diagram of a sensor according to the invention and of a fuel cell controller.

FIG. 2 shows a block diagram of the double sensor 1 mounted on a terminal plate 10 of a fuel cell. This figure shows two electrodes 40, corresponding to the electrodes integrated into the fins 3 or 3bis in FIG. 1, and two resistances 30 corresponding to the plates 4 in FIG. 1.

The terminal plate 10 comprises the set of electronic components for shaping the signals output from the measuring devices 3 and 4. Thus the set 11 enables the impedance measurement made between the electrodes 40 to be shaped into a signal 11'. The set 12 enables the measurement of the voltage applied to the resistances 30 to be shaped into a signal 12'.

After being conditioned in this way, the signals 11' and 12' are transmitted to a microcontroller 13 located in the cell controller. This microcontroller 13 then compares the signal 12', corresponding to the flow rate measurement, with one or more predetermined values. Thus, in one example, if the value of the signal 12' falls below a first predetermined value, the microcontroller triggers an alarm to inform a user of the reduction in flow rate. If the flow rate does not increase and the value of the signal 12' falls below a second predetermined value, representing the minimum flow rate required to provide the proper cooling of the cell, this means that there is a risk of degradation of the cell, since cooling is no longer being carried out correctly. In an exemplary embodiment, the microcontroller then causes the fuel cell to be stopped. In a specific embodiment, the first predetermined value is about 10 liters per minute, and the second predetermined value is about 5 liters per minute.

The microcontroller 13 also compares the signal 11', corresponding to the electrical conductivity measurement, with one or more predetermined values. Thus, in one example, if the value of the signal 11' rises above a third predetermined value, the microcontroller triggers an alarm to inform a user of the increase in electrical conductivity. If this conductivity does not decrease and the value of the signal 11' rises above a fourth predetermined value, representing the maximum acceptable electrical conductivity for avoiding excessive corrosion of the fuel cell elements, then the microcontroller, in an exemplary embodiment, causes the fuel cell to be stopped. In a specific embodiment, the third value is about 12 microsiemens per centimeter, and the fourth value is about 16 microsiemens per centimeter.

Thus the present invention makes it possible to propose a device for monitoring the cooling circuit of a fuel cell which can be used to detect any operating anomaly in the cooling circuit, and thus to stop the fuel cell in advance of any damage.

The invention claimed is:

1. A cooling circuit for a fuel cell, the cooling circuit comprising:
   at least one channel formed in a bipolar plate of the fuel cell, each channel being adapted to permit a cooling fluid to flow;
   a first sensor, which senses a flow rate of the cooling fluid;
   a second sensor, which senses an electrical conductivity of the cooling fluid; and
   a mechanical support on which the first and second sensors are installed, so as to form a double sensor thereon,
   wherein the first sensor, which senses the flow rate of the cooling fluid, includes two fins and a circuit for measuring a temperature difference between the two fins.

2. The cooling circuit according to claim 1, further comprising a sealing gasket positioned between the fins, electrodes corresponding to the second sensor, and a set of electronic components of the first and second sensors.

3. The cooling circuit according to claim 2, wherein the sealing gasket is made of silicone.

4. The cooling circuit according to claim 1, wherein the first and second sensors are adapted to make measurements of the flow rate and the electrical conductivity in real time.

5. The cooling circuit according to claim 1, further comprising a transmitter, which transmits measurements made by the first and second sensors to a controller of a fuel cell in which the cooling circuit is installed.

6. The cooling circuit according to claim 1, wherein the mechanical support is provided with a gasket, which is structured to prevent leakage of the cooling fluid to outside of the cooling circuit.

7. A cooling circuit for a fuel cell, the cooling circuit comprising:
   at least one channel formed in a bipolar plate of the fuel cell, each channel being adapted to permit a cooling fluid to flow;
   a first sensor, which senses a flow rate of the cooling fluid;
   a second sensor, which senses an electrical conductivity of the cooling fluid; and
   a mechanical support on which the first and second sensors are installed, so as to form a double sensor thereon,
   wherein the second sensor, which senses the electrical conductivity of the cooling fluid, includes two electrodes and a circuit for measuring an impedance between the two electrodes.

8. The cooling circuit according to claim 7, wherein the first and second sensors are adapted to make measurements of the flow rate and the electrical conductivity in real time.

9. The cooling circuit according to claim 7, further comprising a transmitter, which transmits measurements made by the first and second sensors to a controller of a fuel cell in which the cooling circuit is installed.

10. The cooling circuit according to claim 7, wherein the mechanical support is provided with a gasket, which is structured to prevent leakage of the cooling fluid to outside of the cooling circuit.

* * * * *